United States Patent [19]
Eriksson

[11] Patent Number: 6,151,482
[45] Date of Patent: *Nov. 21, 2000

[54] OPERATION AND MAINTENANCE LINK FOR ANTENNA EQUIPMENT

[75] Inventor: Hákan Eriksson, Stockholm, Sweden

[73] Assignee: Telefonaktiebolaget LM (publ), Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/940,337

[22] Filed: Sep. 30, 1997

[51] Int. Cl.$^7$ .................................................. H04B 17/00
[52] U.S. Cl. ....................................... 455/67.1; 455/67.4
[58] Field of Search .................................. 455/423, 67.4, 455/254, 33.1, 67.1, 226.1; 370/321

[56] References Cited

U.S. PATENT DOCUMENTS

| | | | |
|---|---|---|---|
| 5,471,649 | 11/1995 | Rees et al. . | |
| 5,548,820 | 8/1996 | Victorin . | |
| 5,570,098 | 10/1996 | Searle et al. . | |
| 5,604,925 | 2/1997 | O'Malley et al. | 455/254 |
| 5,710,765 | 1/1998 | Lee et al. | 370/321 |
| 5,768,689 | 6/1998 | Borg | 455/67.4 |
| 5,875,397 | 2/1999 | Sasin et al. | 455/423 |
| 5,896,369 | 4/1999 | Warsta | 370/338 |
| 5,905,951 | 5/1999 | Orosz | 455/423 |
| 5,930,707 | 7/1999 | Vambaris et al. | 455/424 |

FOREIGN PATENT DOCUMENTS

0 630 125  4/1991  European Pat. Off. .

*Primary Examiner*—Nguyen Vo
*Assistant Examiner*—Naghmeh Mehrpour
*Attorney, Agent, or Firm*—Jenkens & Gilchrist

[57] ABSTRACT

An operation and maintenance communications link is established between an antenna near parts component and transmitter and receiver of a transceiver site assembly. The transmitter and receiver are connected to a remote antenna by means of a radio frequency feeder supporting a plurality of communications channels. A radio transceiver is connected to the antenna near parts component. A communications connection comprising the operation and maintenance communications link is established between the radio frequency transceiver and the transmitter and receiver over the radio frequency feeder connected to the antenna using a selected one of the supported communications channels. Another implementation further utilizes an air interface connection supporting the selected communications channel to provide the operation and maintenance communications link.

56 Claims, 3 Drawing Sheets

OPERATION AND MAINTENANCE LINK FOR ANTENNA EQUIPMENT

BACKGROUND OF THE INVENTION

1. Technical Field of the Invention

The present invention relates to an antenna equipment assembly and, in particular, to an operation and maintenance interface relating to the antenna equipment assembly.

2. Description of Related Art

In some antenna equipment assemblies, antenna near parts (ANPs), such as tower mounted amplifiers and active antennas with an array of power amplifier modules, are utilized with radio transmitter (TX) and receiver (RX) equipment. Some parameters (for example, gain) concerning operation of the antenna near parts may be configurable. The operation of the antenna near parts may further be controlled by software, and certain instances may arise wherein software upgrades need to be downloaded to the antenna near parts to correct bugs or provide for additional functionality. The antenna near parts may also have built-in test and supervision functions which need to be periodically executed. Still further, the radio transmitter and receiver equipment may need to have knowledge of the capabilities (such as gain, delay, and frequency characteristics) of the antenna near parts. In fact, in many instances, due primarily to the fact that these characteristics may change over time, the radio transmitter and receiver equipment may require real time (or near-real time) knowledge of the characteristics to avoid and appropriately respond to deterioration in system performance. The antenna near parts may further have the capability to detect faults. These faults in many cases need to be reported to the radio transmitter and receiver equipment. In this regard, it is further noted that the antenna near parts may further comprise several independent components, and thus the report may need to be originated from several sources.

With respect to functions performed for supervising transmitter antenna operation, one currently implemented method measures voltage standing wave ratio (VSWR) at the output of the transmitter equipment. This method is unreliable, and thus not preferred, when feeder loss between the transmitter equipment and the antenna is high, or when a tower mounted amplifier (or other auxiliary equipment) is utilized. In these cases, the VSWR measurements do not provide any accurate indication of the presence of a faulty antenna. Reliable supervision of transmitter antenna operation in these cases must be performed as close to the antenna as possible, and reported back to the radio transmitter and receiver equipment for analysis.

The antenna near parts are typically mounted near the physical antenna itself, and remote from the radio transmitter (TX) and receiver (RX) equipment. In order to facilitate parameter configuration, software downloading, execution of built-in test and supervision functions, real time (or near-real time) reporting of capabilities, reporting of detected faults from the potential several independent components of the antenna near parts, and supervision of transmitter antenna operation, a need has arisen for the establishment of an operation and maintenance communications link between the radio transmitter and receiver equipment and the antenna near parts.

One proposed prior art solution is to provide a separate cable connection between the radio transmitter and receiver equipment and the antenna near parts to carry operation and maintenance communications. Any included additional cables needed for operation and maintenance may be connected to the transmitter and receiver equipment via included external ports. This solution is not preferred, however, for a number of reasons. First, any cable used may become faulty (necessitating a replacement), or become disconnected, and lightning protection may be difficult to achieve. Second, where the antenna near parts comprises several independent components, a separate cable may need to be run from each component to the transmitter and receiver equipment, thus further magnifying the foregoing concerns of faults, disconnections and lightning protection. Lastly, if the transmitter and receiver equipment interface for operation and maintenance is provided through the external ports, there is a concern that the number of ports provided may be insufficient to handle the requisite number of operation and maintenance cables as well as handle other conventional alarm-related connections.

Another proposed solution is to communicate the operation and maintenance information over the existing radio frequency feeder connecting the transmitter and receiver equipment to the antenna near parts. This solution advantageously obviates the need to run multiple separate cables or occupy external alarm port connections. A commonly utilized method for communicating operation and maintenance information over the radio frequency feeder is through modulating a direct current applied to the feeder. Although providing a satisfactory solution, this method is limited in application because the applied signals communicating the operation and maintenance information may adversely affect the operation of some antenna near parts components, or interfere with the performance of certain supervision functions (such as tower mounted amplifier supervision) relating to the antenna near parts.

It is recognized, however, that signaling of operation and maintenance information over the radio frequency feeder is the preferred implementation. A need exists then for a system for more efficiently utilizing the radio frequency feeder to communicate operation and maintenance information. In particular, this need exists in the environment of a cellular telephone system radio base station.

SUMMARY OF THE INVENTION

An operation and maintenance communications link is established between an antenna near parts component and transmitter and receiver of a transceiver site assembly. A transceiver is connected to the antenna near parts component. Using this transceiver, a communications connection comprising the operation and maintenance communications link is established with the transmitter and receiver equipment to support the exchange of operations and maintenance information. In one embodiment of the present invention, the operation and maintenance communications link comprises a communications channel established between the antenna near parts component and the transmitter/receiver. In another embodiment, the operation and maintenance communications link comprises a communications channel established between the antenna near parts component and the transmitter/receiver over a supported air interface.

With respect to the first embodiment, the transmitter and receiver are connected to a remote antenna by means of a radio frequency feeder supporting a plurality of communications channels. An antenna near parts component is mounted proximate to the remote antenna. The transceiver is connected to the antenna near parts component. A communications connection comprising the operation and maintenance communications link is established between the transceiver and the transmitter and receiver through the antenna near parts component and over the radio frequency feeder connected to the antenna using one of the supported communications channels.

For the second embodiment, the transmitter and receiver are connected to a remote antenna by means of a radio frequency feeder supporting a plurality of communications channels. An antenna near parts component is mounted proximate to the remote antenna. The transceiver is connected to the antenna near parts component. A communications connection comprising the operation and maintenance communications link is established between the transceiver and the transmitter and receiver over both an air interface connection with the remote antenna and the radio frequency feeder connected to the antenna using one of the supported communications channels.

In a specific implementation of the present invention relating to cellular telephone systems, a mobile station transceiver is connected to an antenna near parts component of a cell site. A communications connection using either a control or traffic channel of the cellular telephone system is then established between the transmitter and receiver of the cellular base station and the mobile station transceiver. Operation and maintenance information is then exchanged over this communications connection. In the first embodiment, the communications connection is established over the radio frequency feeder for the base station and through the antenna near parts component. In the second embodiment, the communications connection is established over the base station supported air interface.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
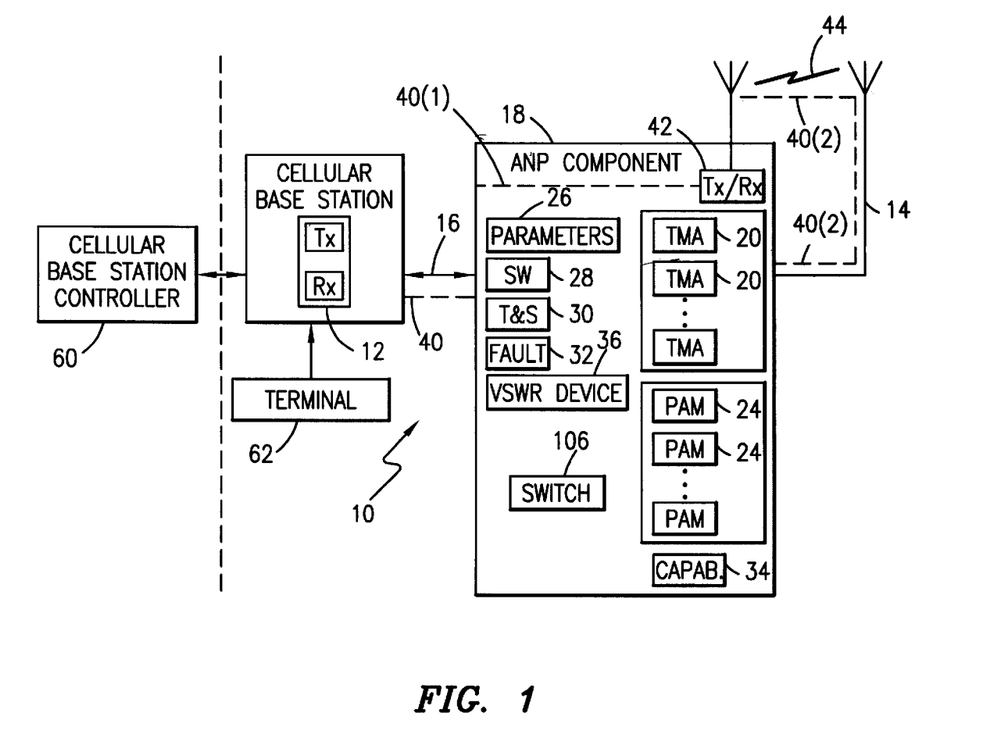
FIG. 1 is a block diagram of a transceiver site assembly in accordance with the present invention.

Reference is now made to FIG. 1 wherein there is shown a block diagram of a transceiver site assembly 10 in accordance with the present invention. The assembly 10 comprises transmitter (TX) and receiver (RX) equipment 12 connected to an antenna 14 via a radio frequency feeder 16. In connection with an implementation in a cellular telephone system, the transmitter and receiver equipment 12 may comprise a cellular radio base station for a cell site. Included in the assembly 10 along the radio frequency feeder 16 near the antenna 14 is any needed antenna near parts (ANPs) component 18, including such devices as tower mounted amplifiers (TMAs) 20 and power amplifier modules (PAMs) 24. Certain parameters 26 (for example, gain) concerning operation of the antenna near parts component 18 may be configurable in response to commands sent from the transmitter and receiver equipment 12. The operation of the antenna near parts component 18 may further be controlled by software (SW) 28, and certain instances may arise wherein software upgrades need to be downloaded to the antenna near parts components to correct bugs or provide for additional functionality. The antenna near parts component 18 may also have built-in test and supervision functions (T&S) 30 which need to be periodically executed in response to commands sent from the transmitter and receiver equipment 12. The antenna near parts component 18 may further have the capability 32 to detect faults that need to be reported to the radio transmitter and receiver equipment 12. The currently applicable capabilities (such as gain, delay, and frequency characteristics) 34 of the antenna near parts component 18 are further maintained for radio transmitter and receiver equipment 12 on a real time (or near-real time) basis. In order to perform functions for supervising transmitter antenna operation, a device 36 is also included in the antenna near parts component 18 for measuring voltage standing wave ratio (VSWR) close to the antenna 14 for report back to the transmitter and receiver equipment 12.

An operation and maintenance communications link (illustrated by a broken line) 40 and either 40(1) or 40(2) is established between the antenna near parts component 18 and the radio transmitter and receiver equipment 12 using the radio frequency feeder 16 for the transport of operation and maintenance information relating to parameter configuration, software downloading, execution of built-in test and supervision functions, real time (or near-real time) reporting of capabilities, reporting of detected faults from the potential several independent components of the antenna near parts component, and supervision of transmitter antenna operation. To accomplish the communication of this information over the operation and maintenance communications link 40 and either 40(1) or 40(2) using the radio frequency feeder 16, a radio frequency transceiver (TX/RX) 42 is connected to the antenna near parts components 18 for information communication therewith. In connection with an implementation in a cellular telephone system, the radio frequency transceiver 42 may comprise a cellular mobile station. Using the radio frequency transceiver 42, a connection over either a control or traffic channel comprising the operation and maintenance communications link 40 and either 40(1) or 40(2) is established with the radio transmitter and receiver equipment 12. In a first embodiment of the present invention, this established communications link 40 passes through the antenna near part component 18 (as generally indicated at 40 (1)). In a second embodiment of the present invention, this established communications link 40 passes through the antenna 14 and over an air interface 44 and the radio frequency feeder 16 (as generally indicated at 40 (2)) Once this call connection is established, the radio transmitter and receiver equipment 12 may send operation and maintenance information to, and receive operation and maintenance information from, the antenna near parts component 18. The operation and maintenance communications link 40 and either 40(1) or 40(2) accordingly advantageously utilizes the existing radio frequency feeder 16 (and in one implementation also the air interface 44), along with their associated radio frequency channel communications, for transport, thus obviating the need for separate cabling connections or voltage level signaling as in the prior art.

Figure 2A:
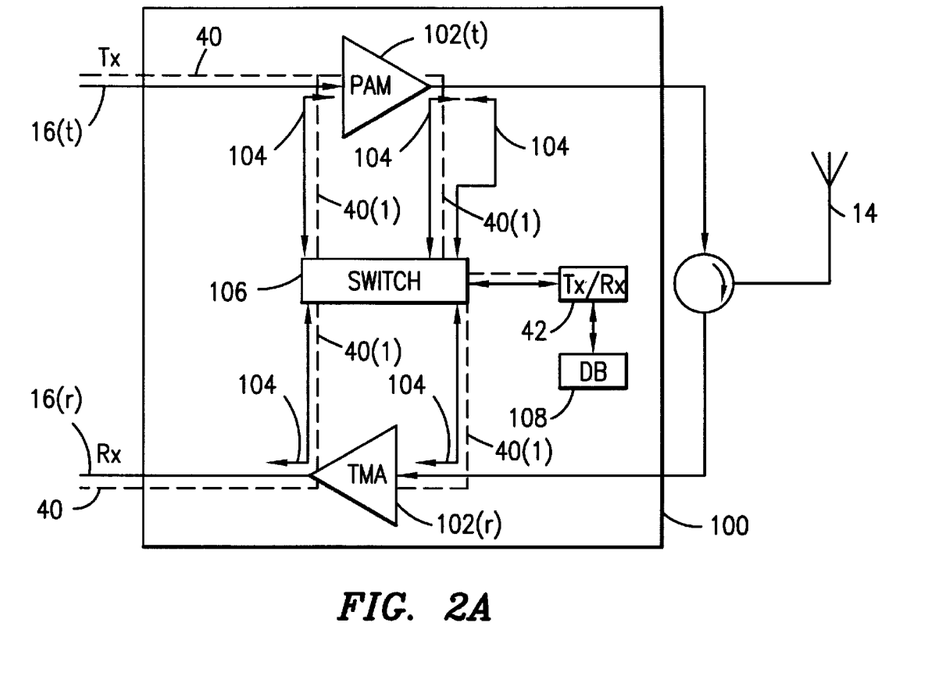
FIGS. 2A–2B are block diagrams for an operations and maintenance portion of an antenna near parts component in accordance with the present invention.
Figure 2B:
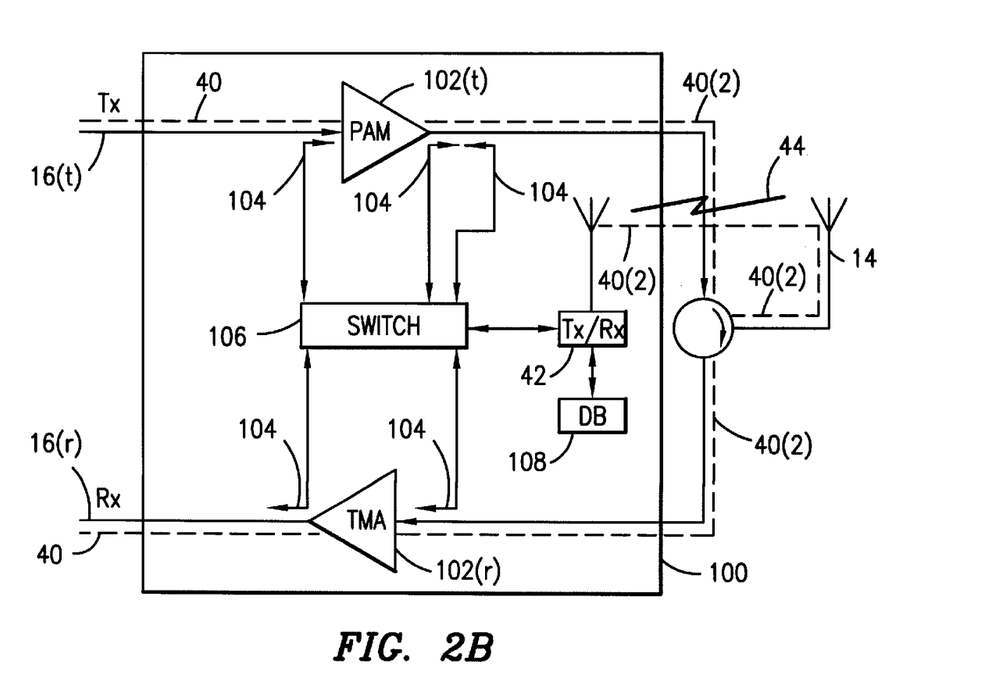

Reference is now made to FIGS. 2A and 2B wherein there are shown block diagrams for an operations and maintenance portion 100 of the antenna near parts component 18 in accordance with the first and second embodiments, respectively, of the present invention. The radio frequency feeder 16 comprises a transmit line 16(*t*) and a receive line 16(*r*). The antenna near parts component 18 includes an amplifier 102(*t*) and 102(*r*) for the transmit line 16(*t*) and the receive line 16(*r*), respectively. A plurality of sensors 104 (comprising, perhaps, directional couplers as illustrated) are included for measuring various characteristics (for example, received power from transmit feeder, transmitted power from power amplifier modules, reflected power from antenna, power output from receiver amplifier to receiver feeder, and receiver power from antenna) of the transmit line 16(*t*) and the receive line 16(*r*). In the illustrated example, sensors 104 are included for measuring characteristics at the input and output of each amplifier 102(*t*) and 102(*r*). A switch 106 is included in the operations and maintenance portion 100 of the antenna near parts component 18 for selecting input from among the various included sensors 104. This selection may be made automatically by the switch 106 itself to cycle through each of the sensor 104, or alternatively may be made in response to received commands. The radio frequency transceiver 42 is further connected to an antenna near parts database (DB) 108 that stores data relating to antenna near parts component 18 operation (such as, parameter configuration, fault detection, capabilities, and the like). This information is stored in the database 108 in the course of normal operation of functionalities provided by the antenna near parts component 18. On either a periodic basis, or upon received request, the stored information in the database 108 is retrieved by the radio frequency transceiver 42 for communication via an operation and maintenance communications link 40 and either 40(1) or 40(2) over the receive line 16(*r*) of the radio frequency feeder 16 to the radio transmitter and receiver equipment (not shown, see FIG. 1). Furthermore, operation and maintenance related information is received by the radio frequency transceiver 42 from the radio transmitter and receiver equipment (not shown, see FIG. 1) via an operation and maintenance communications link 40 and either 40(1) or 40(2) over the transmit line 16(*t*) of the radio frequency feeder 16. Accordingly, operation and maintenance information relating to, as shown in particular in FIG. 1, parameter configuration, software downloading, execution of built-in test and supervision functions, real time (or near-real time) reporting of capabilities, reporting of detected faults from the potential several independent components of the antenna near parts component, and supervision of transmitter antenna operation is communicated either to or from the antenna near parts component 18 using the radio frequency transceiver 42 and its supported operation and maintenance communications link 40 and either 40(1) or 40(2)

Turning now specifically to FIG. 2A, and the first embodiment of the present invention, the switch 106 further functions to selectively connect the radio frequency transceiver 42 to the transmit line 16(*t*) and receive line 16(*r*) for information communication via the operation and maintenance communications link 40 and 40(1) (comprising, in part, a control or traffic channel) and the radio frequency feeder 16 to the radio transmitter and receiver equipment (not shown, see FIG. 1). With respect to FIG. 2B, and the second embodiment of the present invention, the radio frequency transceiver 42 is connected to the transmit line 16(*t*) and receive line 16(*r*) for information communication via the operation and maintenance communications link 40 and 40(2) (comprising, in part, a control or traffic channel) and the radio frequency feeder 16 to the radio transmitter and receiver equipment (not shown, see FIG. 1).

With knowledge of output power and static loss values (with respect to feeders and couplers), and the adjustment of attenuation values in the switch/sensor connections to obtain appropriate signal levels, the appropriate characteristics may be sensed in order to make the following antenna near parts component 18 supervisions: (1) the power level on the transmit line 16(*t*) into the amplifier 102(*t*) is used to supervise the transmit feeder; (2) the power level on the receive line 16(*r*) out of the amplifier 102(*r*) and the power measured by the transmitter and receiver 12 is used to supervise the receive feeder; (3) the power level on the transmit line 16(*t*) into and out of the amplifier 102(*t*) is used to supervise the amplifier itself; (4) the multiple sensed power levels on the transmit line 16(*t*) out of the amplifier 102(*t*) (giving VSWR) are used to supervise the transmit antenna; (5) the power level on the receive line 16(*r*) into and out of the amplifier 102(*r*) is used to supervise the amplifier itself; and (6) a radio frequency loop may be established using the sensors to include both amplifiers 102 (*t*) and 102 (*r*). Furthermore, the power level on the antenna 14 or the transceiver 42 antenna is used to measure interference received by the transceiver 42 on the downlink.

A combined reference is now made to both FIG. 1 and FIGS. 2A and 2B.

Turning specifically now to the certain parameters 26 (for example, gain) concerning operation of the antenna near parts component 18 (including such devices as tower mounted amplifiers 20 and power amplifier modules 24), these parameters may be configurable. Appropriate parameter related commands are sent from the transmitter and receiver equipment (not shown) via the operation and maintenance communications link 40 over the transmit line 16(*t*) of the radio frequency feeder 16 directly to the radio frequency transceiver 42 (using link 40(1)) or to the antenna 14 and over the air interface 44 to the radio frequency transceiver (using link 40(2)). These commands are then passed on to the requisite devices of the antenna near parts component 18 via the switch 106 to effectuate parameter specification. The associated parameters may further be stored for device access in the database 108.

Turning next to the software (SW) 28 controlling operation of the antenna near parts component 18, this software may need to be upgraded at certain times to correct bugs or provide for additional functionality. Appropriate software downloads are sent from the transmitter and receiver equipment (not shown) via the operation and maintenance communications link 40 over the transmit line 16(*t*) of the radio frequency feeder 16 directly to the radio frequency transceiver 42 (using link 40(1)) or to the antenna 14 and over the air interface 44 to the radio frequency transceiver (using link 40(2)). These software downloads are then passed on to the requisite software modules of the antenna near parts component 18 via the switch 106 to effectuate the upgrade. The software may further be stored for access in the database 108.

Turning now to the built-in test and supervision functions 30 of the antenna near parts component 18, these functions may have to be periodically executed. Appropriate execution commands are sent from the transmitter and receiver equipment (not shown) via the operation and maintenance communications link 40 over the transmit line 16(*t*) of the radio frequency feeder 16 directly to the radio frequency transceiver 42 (using link 40(1)) or to the antenna 14 and over the air interface 44 to the radio frequency transceiver (using link 40(2)). These commands are then passed on to the functions 30 of the antenna near parts component 18 for implementation. The results of the test and supervision functions 30 execution are stored in the database 108, and are further communicated by the radio frequency transceiver 42 via the operation and maintenance communications link 40 directly to receive line 16(r) of the radio frequency feeder 16 and the radio transmitter and receiver equipment (not shown) using link 40(1) or over the air interface 44 to the antenna 14 and receive line 16(r) of the radio frequency feeder 16 to the radio transmitter and receiver equipment (not shown) using link 40(2). This results communication may occur automatically following function 30 execution, or periodically in accordance with scheduled communications operations.

Turning now to the fault detection capability 32 of the antenna near parts component 18, notice to the radio transmitter and receiver equipment (not shown) must be provided when faults are detected. Responsive to a fault detection, fault notices are stored by the capability 32 in the database 108, and are further communicated by the radio frequency transceiver 42 via the operation and maintenance communications link 40 directly to receive line 16(r) of the radio frequency feeder 16 and the radio transmitter and receiver equipment (not shown) using link 40(1) or over the air interface 44 to the antenna 14 and receive line 16(r) of the radio frequency feeder 16 to the radio transmitter and receiver equipment (not shown) using link 40(2). These fault notice communications are typically sent automatically following an instance of a fault detection by the capability 32.

Turning next to maintenance of the currently applicable capabilities (such as gain, delay, and frequency characteristics) 34 of the antenna near parts component 18, this maintenance must be performed on a real time (or near-real time) basis. Accordingly, information relating to antenna near parts component 18 capabilities 34 is stored in the database 108. Frequent updating of this information is performed. On either a periodic basis, or upon received request, the stored information in the database 108 is retrieved by the radio frequency transceiver 42 for communication via the operation and maintenance communications link 40 directly to receive line 16(r) of the radio frequency feeder 16 and the radio transmitter and receiver equipment (not shown) using link 40(1), or over the air interface 44 to the antenna 14 and receive line 16(r) of the radio frequency feeder 16 to the radio transmitter and receiver equipment (not shown) using link 40(2), for appropriate analysis.

Turning now to the supervision of transmitter antenna operation, measurements of voltage standing wave ratio (VSWR) on the transmit line 16(t) must be taken close to the antenna 14. Sensors 104 are included for measuring power at various locations along the transmit line 16(t) between the amplifier 102 output and the antenna 14. These power measurements are passed through the switch 106 to the radio frequency transceiver 42. Back-up storage of these measurements may also be made in the database 108. In one implementation, the included processing circuitry (not shown) of the radio frequency transceiver 42 makes the VSWR calculation from the received power measurements, with the calculated ratio communicated by the radio frequency transceiver 42 via the operation and maintenance communications link 40 directly to receive line 16(r) of the radio frequency feeder 16 and the radio transmitter and receiver equipment (not shown) using link 40(1) or over the air interface 44 to the antenna 14 and receive line 16(r) of the radio frequency feeder 16 to the radio transmitter and receiver equipment (not shown) using link 40 (2). In an alternate implementation, the received power measurements are communicated by the radio frequency transceiver 42 via the operation and maintenance communications link 40 directly to receive line 16(r) of the radio frequency feeder 16 and the radio transmitter and receiver equipment (not shown) using link 40 (1), or over the air interface 44 to the antenna 14 and receive line 16(r) of the radio frequency feeder 16 to the radio transmitter and receiver equipment (not shown) using link 40(2), for radio transmitter and receiver equipment calculation of the ratio.

Figure 3:
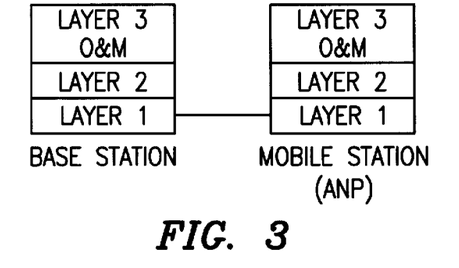
FIG. 3 is an OSI model implementation for the operation and maintenance communications link of the present invention.

Reference is now once again made to FIG. 1, and also to FIG. 3 wherein there is shown an OSI model implementation for the operation and maintenance communications link 40 and either 40(1) or 40(2) of the present invention. The link 40 and either 40(1) or 40(2) advantageously utilizes the existing physical layer (OSI model layer 1) and link layer (OSI model layer 2) being provided through the transceiver site assembly 10 to support other communications. In the context of a cellular telephone system implementation, the physical layer comprises an existing basic physical channel supported by the transceiver site assembly 10 such as a frequency (in an analog system) or a timeslot/frequency (in a digital TDMA system) or a spreading code (in a digital CDMA system) between the base station and mobile station/antenna near parts component (ANP). Still further in the context of the cellular telephone system implementation, the link layer comprises any appropriately selected and set-up signaling (control) channel or traffic channel between the base station and mobile station. For example, the stand alone dedicated control channel (SDDCH), fast associated control channel (FACCH) or any traffic (preferably packet data) channel may be used. In a preferred implementation, this control/traffic channel used to support the operation and maintenance communications link 40 and either 40(1) or 40(2) is set-up once during transceiver site assembly 10 start-up, and perpetually maintained in place to carry operation and maintenance information between the radio transmitter and receiver equipment 12 and the antenna near parts component 18. Alternatively, in situations where bandwidth concerns necessitate other concurrent uses for the channel, a setup is made at each instance (perhaps according to a predetermined schedule) when operation and maintenance information needs to be conveyed. Specific higher layer (i.e., OSI model layer 3 and above) operation and maintenance functions are implemented in the radio transmitter and receiver equipment 12 (of the base station) and the radio frequency transceiver 42 (of the mobile station/antenna near parts component 18) to support communications. To distinguish these functions from other functions (like short message service (SMS) message or radio resource (RR) management), different service access point identifier (SAPI) values are assigned to the various supported functions.

Referring now again to FIG. 1, when implemented in the context of a cellular telephone system, the radio transmitter and receiver equipment 12 comprising a cellular base station is connected to a cellular base station controller (BSC) 60. As cellular communications (and perhaps air interface 44) resources are being used, the base station controller must be involved in the establishment of the control/traffic channel used to support the operation and maintenance communications link 40 and either 40(1) or 40(2). To account for those situations where bandwidth concerns necessitate other concurrent uses for the channel, it is recognized that the operation and maintenance communications link 40 and either 40(1) or 40(2) should not steal capacity from other more important and perhaps revenue generating communications resources. Accordingly, the base station controller 60 exercises control over the processes for selectively activating and deactivating the channel. It should be remembered, however, that whenever possible a perpetual communications connection should be maintained for the operation and maintenance communications link 40 and either 40(1) or 40(2).

Figure 4:
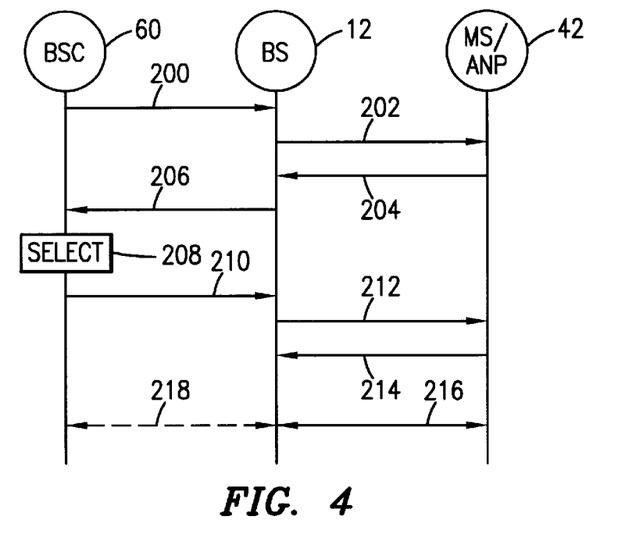
FIG. 4 is a signal flow and nodal operation diagram illustrating base station controller establishment of a channel for supporting the operation and maintenance communications link.

Reference is now made to FIG. 4 wherein there is shown a signal flow and nodal operation diagram illustrating base station controller establishment of a channel for supporting the operation and maintenance communications link 40 and either 40(1) or 40(2). The base station controller (BSC) 60 first sends a paging command 200 to the radio transmitter and receiver equipment 12 (i.e., the cellular base station (BS)). A paging request 202 is then sent by the radio transmitter and receiver equipment 12 to the radio frequency transceiver 42 (i.e., the cellular mobile station (MS)). Responsive to the paging request 202, the radio frequency transceiver 42 sends a channel request 204 back to the radio transmitter and receiver equipment 12. A channel required message 206 is then sent to the base station controller 60. A selection of an appropriate control/traffic channel for use in supporting the operation and maintenance communications link 40 and either 40(1) or 40(2) is then made (action 208), and a notification 210 of the channel selection sent to the radio transmitter and receiver equipment 12 and forwarded 212 on to the radio frequency transceiver 42. The radio frequency transceiver 42 then tunes to and makes an access 214 on the selected channel. Responsive to detection of this channel access by the radio transmitter and receiver equipment 12, the operation and maintenance communications link 40 and either 40(1) or 40(2) is established 216 between the radio transmitter and receiver equipment 12 and the radio frequency transceiver 42 over the selected channel. The base station controller 60 technically remains as a part of the link 40 and either 40(1) or 40(2) on the selected channel (see, dotted line 218) although it does not participate in any of the communications. A release of the selected channel occurs either in response to base station controller 60 implementation of a channel release procedure (for example, when the channel is needed for traffic use), or when the radio frequency transceiver 42 disconnects the layer 2 link (for example, when no further operation and maintenance communications need to be made).

Figure 5:
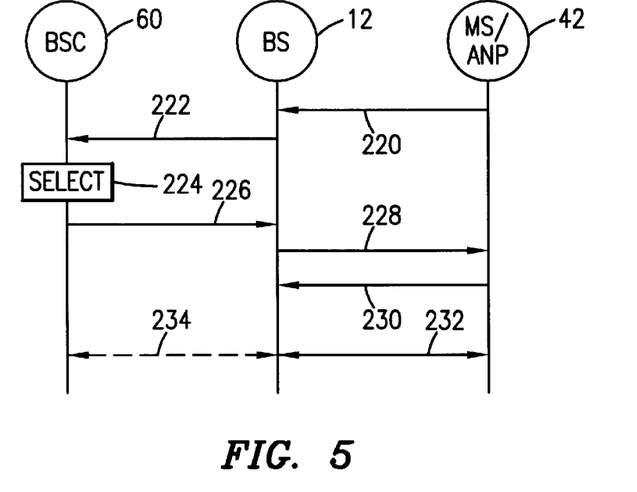
FIG. 5 is a signal flow and nodal operation diagram illustrating radio frequency transceiver (mobile station) establishment of a channel for supporting the operation and maintenance communications link.

Reference is now made to FIG. 5 wherein there is shown a signal flow and nodal operation diagram illustrating radio frequency transceiver (mobile station) establishment of a channel for supporting the operation and maintenance communications link 40 and either 40(1) or 40(2). The radio frequency transceiver 42 (i.e., the cellular mobile station) sends a channel request 220 to the radio transmitter and receiver equipment 12 (i.e., the cellular base station). This channel request may, for example, be initiated when a fault is detected by the antenna near parts component. A channel required message 222 is then sent to the base station controller 60. A selection of an appropriate control/traffic channel for use in supporting the operation and maintenance communications link 40 and either 40(1) or 40(2) is then made (action 224), and a notification 226 of the channel selection sent to the radio transmitter and receiver equipment 12 and forwarded 228 on to the radio frequency transceiver 42. The radio frequency transceiver 42 then tunes to and makes an access 230 on the selected channel. Responsive to detection of this channel access by the radio transmitter and receiver equipment 12, the operation and maintenance communications link 40 and either 40(1) or 40(2) is established 232 between the radio transmitter and receiver equipment 12 and the radio frequency transceiver 42. The base station controller 60 technically remains as a part of the link 40 and either 40(1) or 40(2) on the selected channel (see, dotted line 234) although it does not participate in any of the communications. A release of the selected channel occurs either in response to base station controller 60 implementation of a channel release procedure (for example, when the channel is needed for traffic use), or when the radio frequency transceiver 42 disconnects the layer 2 link (for example, when no further operation and maintenance communications need to be made). Reference is now once again made to FIG. 1. At installation of the cellular base station (comprising the transceiver site assembly 10), a communications link to the base station controller 60 may not yet exist. In this "stand alone" base station configuration, an operation and maintenance communications link 40 and either 40(1) or 40(2) may still need to be established with the antenna near parts component 18. Some of the base station controller 60 supported functions with respect to channel establishment must accordingly be supported by the base station through a remote terminal 62. To support stand alone operation, system information must be sent out (comprising mandatory system information types 2, 3 and 4). This information is loaded into the base station with default values before any broadcast control channel (BCCH) information is transmitted. These default values are chosen carefully in order to avoid that any other mobile stations in the vicinity camp onto the stand alone base station, and further to avoid the mobile station comprising the radio frequency transceiver 42 of the antenna near parts component 18 camping on to another base station. The following examples illustrate system information values:

for system information type 2:
neighbor cell description=no neighbors,
public land mobile network (PLMN) permitted=only own PLMN,
random access channel (RACH) control=bar the cell for all mobile stations, and modify the antenna near parts component 18 software to neglect that the cell is barred;

for system information type 3:
cell identity=dummy value for stand alone base station,
control channel description=no periodic updating, all other parameters chosen with appropriate values,
cell options=discontinuous transmission (DTX) and power control (PWRC) are not interesting, the channel is not a speech channel, signaling on channel C0 where power control has no effect, and radio link should be good; and for system information type 4:
the cell broadcast channel (CBCH) should not be used. Additionally, the base station must be able to support the paging, channel activation, channel selection and channel assignment messages and actions described in FIG. 4. Furthermore, output power from the stand alone base station purposefully selected (through controlling amplifier 102($t$)) as low as possible to avoid interference with the radio network.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system, comprising:
    a first radio frequency transceiver;
    an antenna remotely located from the first radio frequency transceiver supporting first radio frequency transceiver communication over an air interface;

a radio frequency feeder connecting the first radio frequency transceiver to the remotely located antenna;

antenna near parts mounted proximate to the remotely located antenna and operable to exchange antenna near parts related operation and maintenance information;

a second radio frequency transceiver connected to the antenna near parts; and an operation and maintenance communications link connecting the antenna near parts for communication through the second radio frequency transceiver to the first radio frequency transceiver for the exchange of antenna near parts related operation and maintenance information communicated over the radio frequency feeder, the communications link comprising a communications channel supported by the radio frequency feeder.

2. The system as in claim 1 wherein the communications channel is further supported by the air interface and the remotely located antenna.

3. The system as in claim 1 wherein the communications channel comprises a traffic channel.

4. The system as in claim 1 wherein the communications channel comprises a control channel.

5. The system as in claim 1 wherein the communications channel comprises a basic physical channel supported by the air interface and radio frequency feeder.

6. The system as in claim 5 wherein the basic physical channel comprises a frequency channel.

7. The system as in claim 5 wherein the basic physical channel comprises a time slot channel within a frequency.

8. The system as in claim 5 wherein the basic physical channel comprises a code division multiple access (CDMA) channel.

9. The system as in claim 1 wherein the exchanged operation and maintenance information comprises information concerning supervision of the antenna near parts.

10. The system as in claim 9 wherein supervision is provided using the exchanged operation and maintenance information as to one of:

a transmit feeder portion of the radio frequency feeder;

a receive feeder portion of the radio frequency feeder;

an amplifier of the antenna near parts;

the remotely located antenna through a voltage standing wave ratio measurement;

a radio frequency loop within the antenna near parts; and interference with respect to downlink communications.

11. A cellular communications system, comprising:

a base station including a base station radio frequency transceiver capable of radio frequency communicating over a plurality of available channels;

an antenna connected to and remotely located from the base station;

a radio frequency feeder connecting the base station transceiver to the antenna;

antenna near parts mounted proximate to the remotely located antenna and operable to exchange antenna near parts related operation and maintenance information;

a mobile station transceiver connected to the antenna near parts and in communication with the base station radio frequency transceiver over a selected one of the available channels comprising an operation and maintenance communications link supporting the exchange of antenna near parts related operation and maintenance information between the antenna near parts and the base station radio frequency transceiver through the mobile station transceiver and over the radio frequency feeder.

12. The system as in claim 11 wherein the mobile station transceiver is in communication with the base station radio frequency transceiver over an air interface supporting the selected one of the available channels.

13. The system as in claim 11 wherein the selected one of the available channels comprises a traffic channel.

14. The system as in claim 11 wherein the selected one of the available channels comprises a control channel.

15. The system as in claim 11 wherein the selected one of the available channels comprises a basic physical channel supported by a radio frequency feeder connecting the base station to the antenna.

16. The system as in claim 15 wherein the basic physical channel is further supported by an air interface connection using the antenna.

17. The system as in claim 15 wherein the basic physical channel comprises a cellular system frequency channel.

18. The system as in claim 15 wherein the basic physical channel comprises a cellular system time slot channel within a frequency.

19. The system as in claim 15 wherein the basic physical channel comprises a code division multiple access (CDMA) channel.

20. The system as in claim 11 wherein the operation and maintenance information is exchanged using a cellular short message service (SMS) message communication over the selected one of the available channels.

21. The system as in claim 11 wherein the exchanged operation and maintenance information comprises information concerning supervision of the antenna near parts.

22. The apparatus as in claim 1 wherein the antenna near parts device comprises a tower mounted amplifier for the antenna.

23. The apparatus as in claim 1 wherein the antenna near parts device comprises a power amplifier module for the antenna.

24. The apparatus as in claim 1 wherein the antenna near parts device comprises:

a plurality of sensors for sensing operational characteristics of the antenna near parts device; and a switch for selectively choosing input from the sensors for output to the radio frequency transceiver and communication as the operation and maintenance information.

25. A method for establishing an operation and maintenance communications link between a cellular radio base station and a mobile station associated with and mounted proximately to antenna near parts for the cellular radio base station, comprising the steps of:

polling for the mobile station mounted proximately to the antenna near parts, wherein the antenna near parts are mounted proximate an antenna remotely located from the base station;

responding to a polling response received from the mobile station by selecting one of a plurality of available cellular communications channels for use as the operation and maintenance communications link;

communicating a channel assignment to the mobile station; and responding to an access by the mobile station on the selected communications channel by connecting the radio base station with the mobile station for the exchange of antenna near parts related operation and maintenance information over that channel between the radio base station and the antenna near parts through the mobile station.

26. A method for establishing an operation and maintenance communications link between a cellular radio base station and a mobile station associated with and mounted proximate to antenna near parts for the cellular radio base station, comprising the steps of:

responding to a channel request from the mobile station mounted proximately to the antenna near parts by selecting one of a plurality of available cellular communications channels for use as the operation and maintenance communications link, wherein the antenna near parts are mounted proximate an antenna remotely located from the base station;

communicating a channel assignment to the mobile station; and responding to an access by the mobile station on the selected communications channel by connecting the radio base station with the mobile station for the exchange of antenna near parts related operation and maintenance information over that channel between the radio base station and the antenna near parts through the mobile station.

27. A system, comprising:

a base station including a base station radio frequency transceiver;

an antenna remotely located from the base station and supporting base station radio frequency transceiver communication over an air interface supporting a plurality of radio frequency communications channels;

antenna near parts mounted proximate to the remotely located antenna and including a capability for detecting faults in the operation of the antenna near parts and generating signals indicative of such fault detection;

a radio frequency feeder connecting the base station radio frequency transceiver to the remotely located antenna through the proximately mounted antenna near parts using the plurality of radio frequency communications channels;

a remote radio frequency transceiver connected to the antenna near parts to receive the signals indicative of fault detection from the antenna near parts; and an operation and maintenance communications link connecting the remote radio frequency transceiver at the antenna near parts to the base station radio frequency transceiver for the communication of the received antenna near parts related signals indicative of fault detection to the base station, wherein the operation and maintenance communications link comprises a certain one of the plurality of radio frequency communications channels supported by the radio frequency feeder.

28. The system as in claim 27 wherein the operation and maintenance communications link comprises the certain one of the plurality of radio frequency communications channels supported by the radio frequency feeder and additionally a certain one of the plurality of radio frequency communications channels supported by the air interface.

29. The system as in claim 27 wherein the certain one of radio frequency communications channels comprises one of a traffic channel or a control channel.

30. The system as in claim 27 wherein the certain one of the radio frequency communications channels comprises a basic physical channel supported by both the air interface and radio frequency feeder.

31. The system as in claim 30 wherein the basic physical channel comprises one of a frequency channel, a time slot channel within a frequency or a code division multiple access (CDMA) channel.

32. The system as in claim 27 wherein the antenna near parts device comprises one of a tower mounted amplifier for the antenna or a power amplifier module for the antenna.

33. The system as in claim 27 wherein the antenna near parts related signals indicative of fault detection are sent using a cellular short message service (SMS) message communication over the certain one of the radio frequency communications channels.

34. A system, comprising:

a base station including a base station radio frequency transceiver;

an antenna remotely located from the base station and supporting base station radio frequency transceiver communication over an air interface supporting a plurality of radio frequency communications channels;

antenna near parts mounted proximate to the remotely located antenna and controlled by software;

a radio frequency feeder connecting the base station radio frequency transceiver to the remotely located antenna through the proximately mounted antenna near parts using the plurality of radio frequency communications channels;

a remote radio frequency transceiver connected to the antenna near parts to download a received software upgrade to the antenna near parts; and an operation and maintenance communications link connecting the base station radio frequency transceiver to the remote radio frequency transceiver at the antenna near parts for the communication of the software upgrade to the antenna near parts from the base station, wherein the operation and maintenance communications link comprises a certain one of the plurality of radio frequency communications channels supported by the radio frequency feeder.

35. The system as in claim 34 wherein the operation and maintenance communications link comprises the certain one of the plurality of radio frequency communications channels supported by the radio frequency feeder and additionally a certain one of the plurality of radio frequency communications channels supported by the air interface.

36. The system as in claim 34 wherein the certain one of radio frequency communications channels comprises one of a traffic channel or a control channel.

37. The system as in claim 34 wherein the certain one of the radio frequency communications channels comprises a basic physical channel supported by both the air interface and radio frequency feeder.

38. The system as in claim 37 wherein the basic physical channel comprises one of a frequency channel, a time slot channel within a frequency or a code division multiple access (CDMA) channel.

39. The system as in claim 34 wherein the antenna near parts device comprises one of a tower mounted amplifier for the antenna or a power amplifier module for the antenna.

40. The system as in claim 34 wherein the upgrade to the antenna near parts software is sent using a cellular short message service (SMS) message communication over the certain one of the radio frequency communications channels.

41. A system, comprising:

a base station including a base station radio frequency transceiver;

an antenna remotely located from the base station and supporting base station radio frequency transceiver communication over an air interface supporting a plurality of radio frequency communications channels;

antenna near parts mounted proximate to the remotely located antenna;

a radio frequency feeder connecting the base station radio frequency transceiver to the remotely located antenna through the proximately mounted antenna near parts using the plurality of radio frequency communications channels;

a sensor for measuring power on the radio frequency feeder at the location of the antenna near parts and generating signals indicative of such measured feeder power;

a remote radio frequency transceiver connected to receive the signals indicative of measured feeder power from the sensor; and an operation and maintenance communications link connecting the remote radio frequency transceiver at the antenna near parts to the base station radio frequency transceiver for the communication of the measured feeder power related signals to the base station, wherein the operation and maintenance communications link comprises a certain one of the plurality of radio frequency communications channels supported by the radio frequency feeder.

42. The system as in claim 41 wherein the operation and maintenance communications link comprises the certain one of the plurality of radio frequency communications channels supported by the radio frequency feeder and additionally a certain one of the plurality of radio frequency communications channels supported by the air interface.

43. The system as in claim 41 wherein the certain one of radio frequency communications channels comprises one of a traffic channel or a control channel.

44. The system as in claim 41 wherein the certain one of the radio frequency communications channels comprises a basic physical channel supported by both the air interface and radio frequency feeder.

45. The system as in claim 44 wherein the basic physical channel comprises one of a frequency channel, a time slot channel within a frequency or a code division multiple access (CDMA) channel.

46. The system as in claim 41 wherein the antenna near parts device comprises one of a tower mounted amplifier for the antenna or a power amplifier module for the antenna.

47. The system as in claim 41 wherein the measured feeder power related signals are sent using a cellular short message service (SMS) message communication over the certain one of the radio frequency communications channels.

48. The system as in claim 41 wherein the remote radio frequency transceiver processes the signals indicative of measured feeder power to calculate a voltage standing wave ratio, and then communicates the calculated voltage standing wave ratio to the base station radio frequency transceiver over the operation and maintenance communications link.

49. The system as in claim 41 wherein the base station radio frequency transceiver receives the signals indicative of measured feeder power over the operation and maintenance communications link and processes those signals to calculate a voltage standing wave ratio.

50. A system, comprising:

a base station including a base station radio frequency transceiver;

an antenna remotely located from the base station and supporting base station radio frequency transceiver communication over an air interface supporting a plurality of radio frequency communications channels;

an amplifier mounted proximate to the remotely located antenna and having a configurable gain operation;

a radio frequency feeder connecting the base station radio frequency transceiver to the remotely located antenna through the proximately mounted amplifier using the plurality of radio frequency communications channels;

a remote radio frequency transceiver connected to the amplifier to forward a received a gain parameter to the amplifier to configure its gain operation; and an operation and maintenance communications link connecting the base station radio frequency transceiver to the remote radio frequency transceiver at the antenna near parts for the communication of the gain parameter from the base station, wherein the operation and maintenance communications link comprises a certain one of the plurality of radio frequency communications channels supported by the radio frequency feeder.

51. The system as in claim 50 wherein the operation and maintenance communications link comprises the certain one of the plurality of radio frequency communications channels supported by the radio frequency feeder and additionally a certain one of the plurality of radio frequency communications channels supported by the air interface.

52. The system as in claim 50 wherein the certain one of radio frequency communications channels comprises one of a traffic channel or a control channel.

53. The system as in claim 52 wherein the certain one of the radio frequency communications channels comprises a basic physical channel supported by both the air interface and radio frequency feeder.

54. The system as in claim 53 wherein the basic physical channel comprises one of a frequency channel, a time slot channel within a frequency or a code division multiple access (CDMA) channel.

55. The system as in claim 50 wherein the amplifier comprises one of a tower mounted amplifier or a power amplifier module for the antenna.

56. The system as in claim 50 wherein the gain parameter is sent using a cellular short message service (SMS) message communication over the certain one of the radio frequency communications channels.

* * * * *

UNITED STATES PATENT AND TRADEMARK OFFICE
CERTIFICATE OF CORRECTION

PATENT NO. : 6,151,482
DATED : November 21, 2000
INVENTOR(S) : Håkan Eriksson

It is certified that error appears in the above-identified patent and that said Letters Patent is hereby corrected as shown below:

Please amend the title page of the patent as follows:

Item [73] Assignee   Replace "Telefonaktiebolaget LM (publ)"
                     With --Telefonaktiebolaget LM Ericsson (publ)--

Signed and Sealed this

Tenth Day of July, 2001

*Attest:*

*Attesting Officer*

NICHOLAS P. GODICI
*Acting Director of the United States Patent and Trademark Office*